United States Patent [19]
Trabbic et al.

[11] 3,831,497
[45] Aug. 27, 1974

[54] HYDROSTATIC TRANSMISSION

[75] Inventors: Gerald W. Trabbic, Marshall; Wayne C. Dunn, Homer; Paul E. Hakes, Battle Creek, all of Mich.

[73] Assignee: Eaton Corporation, Cleveland, Ohio

[22] Filed: Mar. 22, 1972

[21] Appl. No.: 237,149

[52] U.S. Cl....................... 91/497, 60/427, 74/491
[51] Int. Cl................................................. F01b 1/06
[58] Field of Search.......... 92/12.1; 60/52 NS, 53 B, 60/427; 91/497; 74/491

[56] References Cited
UNITED STATES PATENTS

| | | | |
|---|---|---|---|
| 2,019,264 | 10/1935 | Koons | 60/52 VS |
| 3,171,255 | 3/1965 | Lauck | 91/497 X |
| 3,244,196 | 12/1965 | Bennett | 60/52 VS |
| 3,525,266 | 9/1970 | Brooks et al. | 74/481 |

*Primary Examiner*—C. J. Husar
*Assistant Examiner*—Leonard Smith
*Attorney, Agent, or Firm*—Teagno & Toddy

[57] ABSTRACT

An improved neutral locate and hold assembly is operable to move a displacement control cam for a pump unit of a hydrostatic transmission to a neutral or minimum displacement position and to yieldably retain it there upon movement of the cam to a position closely approximating the neutral position by a manually actuatable control lever. The neutral locate and hold assembly also retards oscillatory movement of the pump displacement control cam under the influence of any hydraulic pulses which may be generated during operation of the hydrostatic transmission. Upon operation of an override or panic stop mechanism, the neutral locate and hold assembly also functions to position and hold the displacement control cam at the neutral position. A linkage interconnecting the control lever and the neutral locate and hold assembly includes a pair of links which are yieldably interconnected by springs to enable the control lever to be moved through a relatively wide range with the pump in a neutral position. The neutral locate and hold assembly may be adjusted to precisely position the displacement control cam at neutral.

22 Claims, 4 Drawing Figures

HYDROSTATIC TRANSMISSION

BACKGROUND OF THE INVENTION

The present invention relates to a new and improved control apparatus for a variable displacement pump unit, and particularly for a variable displacement pump for a hydrostatic transmission.

Hydrostatic transmissions include variable displacement pump units, which pump units include a displacement control cam movable from a neutral position to vary pump displacement. It is desirable in such pumps to position and yieldably hold the displacement control cam in its neutral position in which the pump unit is ineffective to pump fluid under pressure. Moreover, when the displacement control cam of a known hydrostatic transmission is at a forward operating position and the hydrostatic transmission is being subjected to a decreasing load, the displacement control cam tends to move in such a manner as to increase the output speed of the hydrostatic transmission. Similarly, when the hydrostatic transmission is being subjected to an increasing load, the displacement control cam may tend to move in such a manner as to decrease the output speed of the hydrostatic transmission. Also, when the known hydrostatic transmission is operated under conditions in which there is relatively small internal friction on the displacement control cam, the control cam may tend to oscillate due to hydraulic pulses which are generated as fluid is forced under pressure from the pump unit.

Certain prior art efforts have been directed to solving the above-noted problems and, in particular, for ensuring that a displacement control member of a pump unit is positioned to neutral and retained thereat. U.S. Pat. No. 3,525,266 to Brooks et al, for example, is such a structure.

SUMMARY OF THE INVENTION

The present invention is directed to a practical construction of a mechanism for moving a displacement control member of a pump to neutral and for holding the displacement control member at neutral. The neutral locating mechanism functions to move the control member to neutral when it is positioned within a range thereof. The mechanism also applies a force to the displacement control member to hold it in an actuated position (other than neutral) and which thereby minimizes oscillation thereof due to hydraulic pulses acting thereon. The structure of the neutral locate and hold mechanism of the present invention provides for a wide neutral movement of the control member and also enables, in a simple reliable manner, adjustment for providing an accurate neutral position.

Accordingly, it is an object of this invention to provide a new and improved variable displacement pump having a neutral locate and hold device for moving a displacement control cam or member to a neutral position when the displacement control member has been moved to a position closely approximating the neutral position, and which additionally functions to releasably hold the displacement control member at neutral.

Another object of this invention is to provide a new and improved hydrostatic transmission having a holding device for retaining a pump displacement control cam or member against oscillation under the influence of hydraulic pulses which may be generated during operation of the pump and which acts to releasably retain in an actuated position a control link which controls the position of the displacement control cam.

Still another object of the present invention is the provision of a variable displacement pump having a control link which is movable from a neutral condition to an actuated position for controlling pump displacement and which pump includes a neutral locate-and-hold mechanism associated with the displacement control link and which returns the control link to neutral when a manually actuated control handle associated with the link is returned to at least near neutral and which additionally releasably holds the displacement control link in an actuated position to minimize oscillation thereof under the influence of hydraulic pulses generated during operation of the pump.

Yet another object of this invention is to provide a new and improved variable displacement pump having a holding assembly for retaining a pump displacement control cam or member in a neutral position as a control handle or pedal is initially moved from a neutral position to provide a relatively wide range of neutral movement of the control handle or pedal.

DESCRIPTION OF THE DRAWINGS

The above and other objects and features of the present invention will become more apparent upon a consideration of the following description taken in connection with the accompanying drawings wherein.

DESCRIPTION OF THE PREFERRED EMBODIMENT

Figure 1:
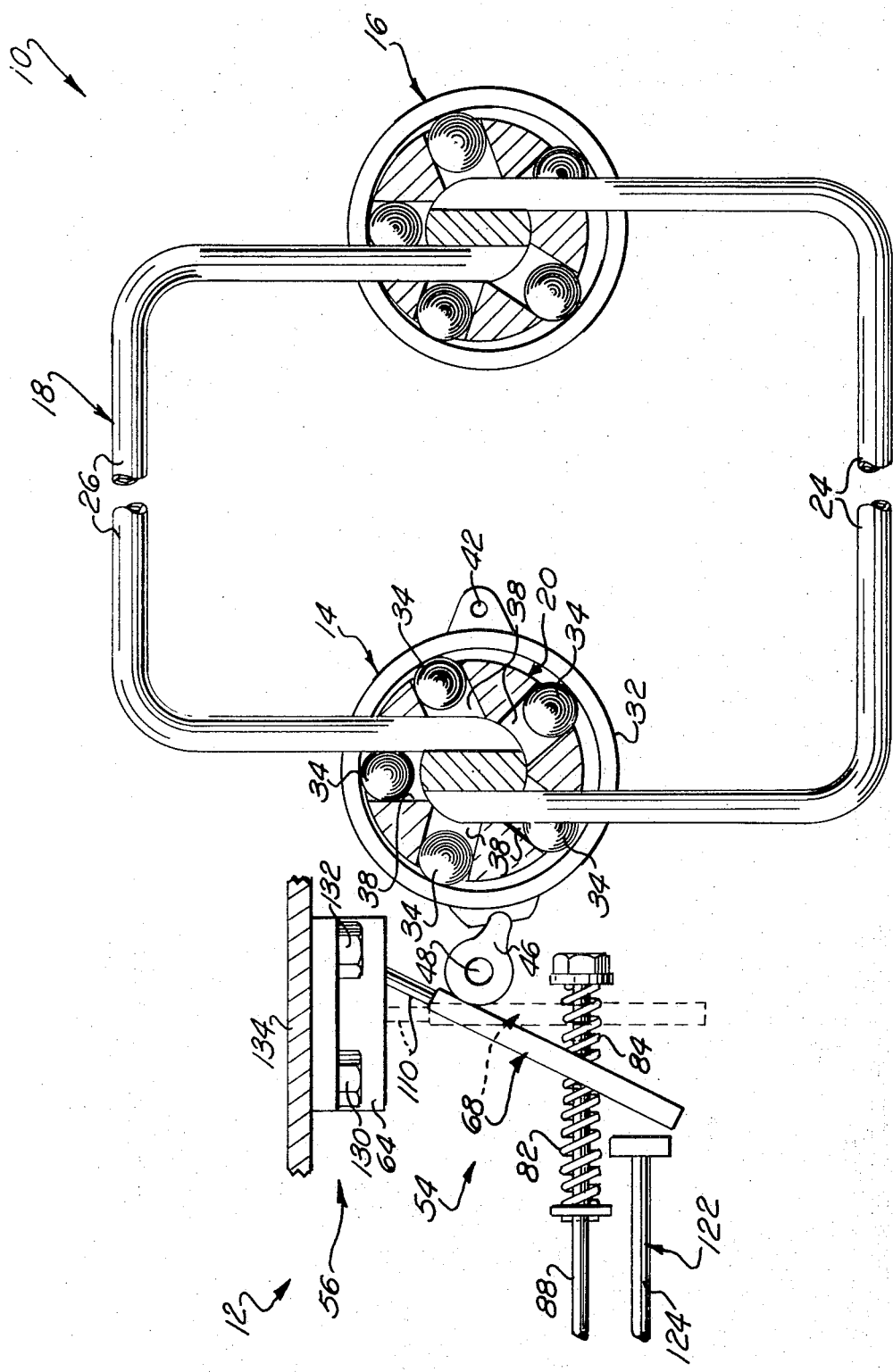
FIG. 1 is a schematic illustration of a hydrostatic transmission having a neutral locate-and-hold assembly constructed in accordance with the present invention.

A hydrostatic transmission 10 having a control apparatus 12 constructed in accordance with the present invention includes a reversible and variable displacement pump unit 14 which is connected with a reversible hydraulic motor 16 by a closed loop fluid circuit 18. During operation of the hydrostatic transmission 10, a carrier or rotor 20 of the pump 14 is rotated by an engine or other suitable source of power to pump fluid under pressure through a conduit 24 to the motoor 16. This relatively high pressure fluid causes the motor 16 to operate in a known manner to drive a vehicle or perform other operations. Relatively low pressure fluid is conducted from the motor 16 through a conduit 26 back to the pump 14 for recirculation.

The ratio of input to output speed of the hydrostatic transmission 10 is varied by actuation of the control apparatus 12. To vary the effective displacement ofthe pump 14 and the input to output speed ratio of the hydrostatic transmission 10, a cam or control ring 32 is movable by the control apparatus 12 to vary the stroke of ball type pistons 34 relative to the carrier or rotor 20 which has cylinders 38 in which the pistons are slidably disposed. The direction of operation of the motor 14 is reversed by reversing the direction of fluid flow from the pump 12. This is accomplished by operating the control apparatus 12 to pivot the displacement control cam 32 about a mounting 42 from the illustrated forward operating condition through a neutral condition to a reverse operated condition.

To move the displacement control cam 32 from the illustrated forward operated condition to either the neutral or reverse operated conditions, an actuator member 46 is rotated in a counterclockwise direction (as viewed in FIG. 1) about its central axis 48 to move the cam ring 32 in a clockwise direction about the connection 42. This movement of the cam ring 32 operates the pump 14 to a neutral condition which it has zero effective displacement. Continued movement of the actuator member 46 in the counterclockwise direction continues to move the displacement control cam ring 32 in a clockwise direction about the connection 42 to a reverse operated condition. The pump 14 is then effective to force fluid under pressure into the conduit 26. Since the manner of operation of the pump and motor units 14 and 16 and the cam ring 32 is well known to those skilled in the art, they will not be further described herein to avoid prolixity of description. However, it should be understood that other types of pump and motor units, such as the axial piston type, could be utilized.

The control assembly 12 (see FIG. 2) is selectively operable to rotate the actuator member 46 and cam ring 32. Accordingly, the control assembly 12 includes a manually actuable control lever 52 which is connected with the actuator member 46 and cam ring 32 by a linkage 54. A neutral locate and hold assembly 56 cooperates with the linkage 54 to hold the actuator 46 in the neutral position illustrated in FIG. 2 during limited rotation of the control handle 52 in either the forward or reverse direction about the pivot connection 60. However as the control handle 52 continues to move from the illustrated neutral position, the actuator member 46 is moved against the influenece of the neutral locate and hold assembly 56 to an actuated position corresponding to the extent of movement of the handle 52. The neutral locate and hold assembly 56 then cooperates with the linkage 46 to hold it in a position to which it is moved by operation of the control handle 52. Upon movement of the handle 52 back to the illustrated neutral position of FIG. 2, the neutral locate and hold assembly 56 cooperates with the linkage 54 to move the actuator member 46 to the illustrated neutral position even though the actuator member 46 is only moved to a position which closely approximates the illustrated neutral position by movement of the handle 52.

Figure 3:
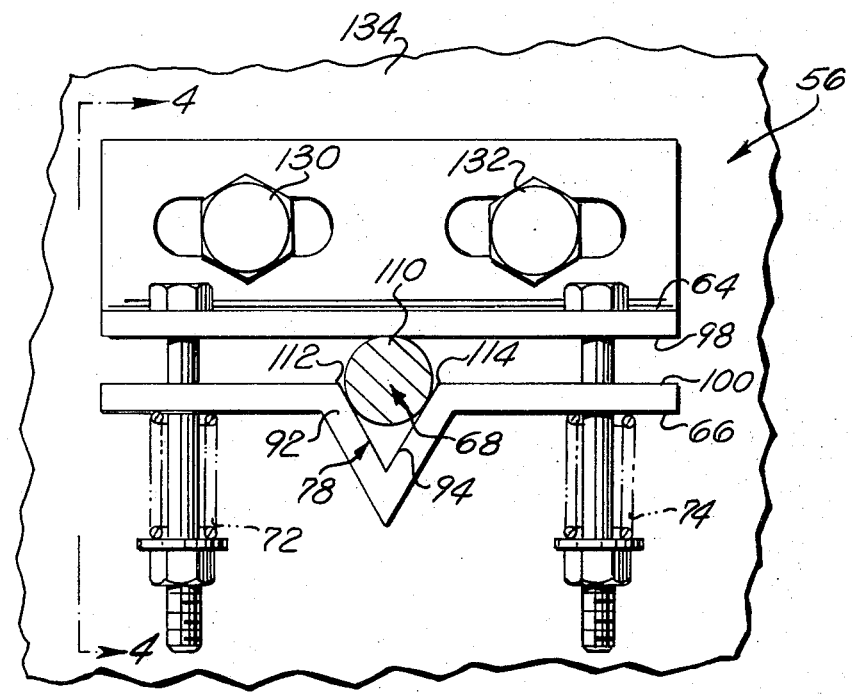
FIG. 3 is an elevational view, taken generally along the line 3—3 of FIG. 2, illustrating the relationship between the neutral locate and hold assembly and a control arm or link when the hydrostatic transmission is in a neutral condition.
Figure 4:
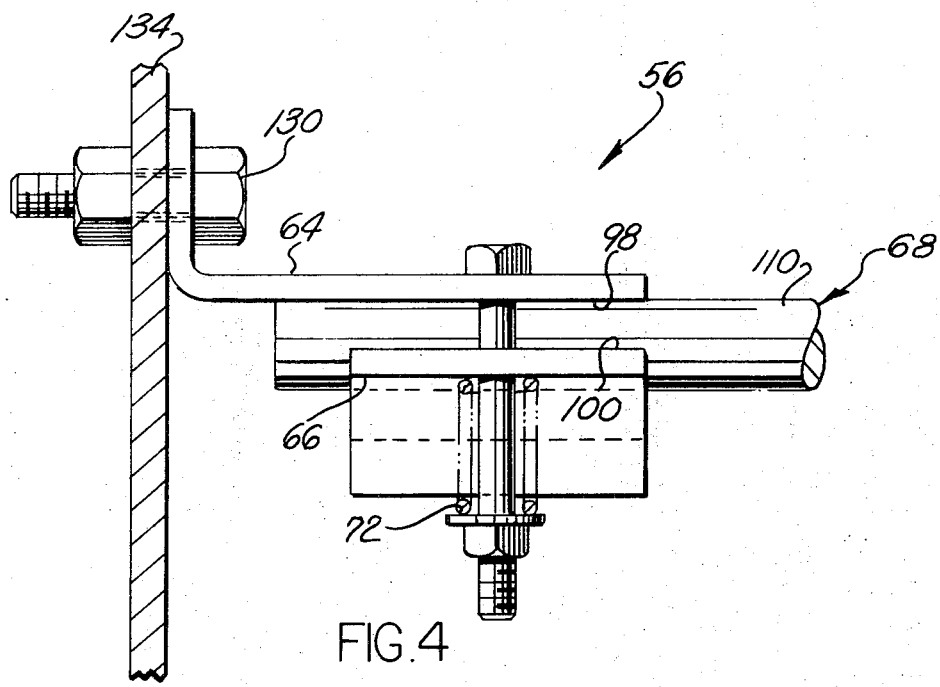
FIG. 4 is an elevational view, taken generally along the line 4—4 of FIG. 3, further illustrating the construction of the neutral locate and hold assembly.

Once the actuator member 46 and cam ring 32 have been returned to their neutral positions, they are held there by the neutral locate and hold assembly 56. To this end, the neutral locate and hold assembly 56 includes upper and lower holding plates 64 and 66 which yieldably hold a control arm or link 68 of the linkage 64 to retain the actuator member 46 and cam ring 32 in the neutral position. To enable the plates 64 and 66 to grip the control arm 68, the upper and lower holding plates 64 and 66 are urged into frictional pressure engagement with opposite sides of the control link 68 by a pair of biasing springs 72 and 74 (FIGS. 3 and 4). To further provide for retention of the control link 68 and actuator number 46 in the illustrated neutral position, the lower holding plate 66 is provided with a locating groove on recess 78 into which the control lever 68 extends when the hydrostatic transmission 10 is in a neutral condition.

Figure 2:
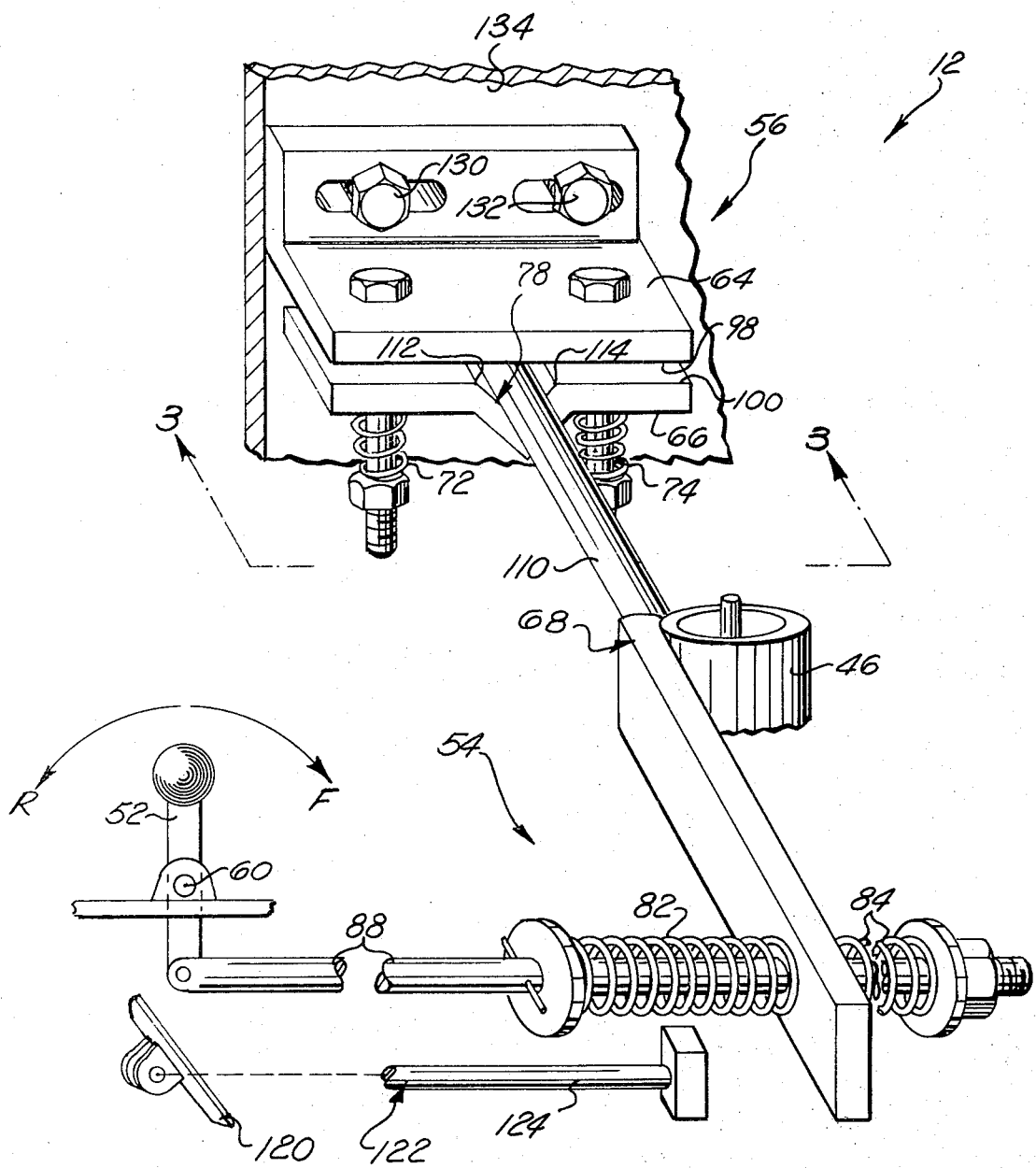
FIG. 2 is an enlarged schematic illustration of the neutral locate-and-hold assembly of FIG. 1.

It is desirable to enable the control handle 52 to be moved through a substantial distance in either the forward or reverse directions from the neutral position of FIG. 2 before the linkage 54 rotates the actuator 46 and cam ring 32 to change the displacement of the pump 14. To provide for this initial movement of the control handle 52 from the neutral position without varying the displacement of the pump unit 14, the linkage arragement 54 inlcudes a pair of springs 82 and 84 which yieldably interconnect the link 68 and a link 88 which is connected directly to the handle 52. Thus, during initial movement of the handle 52 from the neutral position toward a forward actuated position, the neutral locate and hold assembly 56 holds the link 68 against movement. This causes the spring 84 to be compressed as the control link 88 is moved toward the left (as seen in FIG. 2) by the clockwise rotation of the handle 52. As the spring 84 is compressed, the force transmitted from the control rod 88 to the control arm 68 increases until it is sufficient to overcome the retaining force applied to the control arm 68 by the neutral locate and hold assembly 56. As this occurs, the control arm 68 presses against side surfaces 92 and 94 (see FIG. 3) of the V-shaped recess 78 to cam or force the lower holding plate 66 downwardly against the influence of the springs 72 and 74.

Continued movement of the handle 52 in the forward direction causes the control link 68 to move from the neutral position shown in dashes lines in FIG. 1 to a forward actuated position shown in solid lines in FIG. 1. Of course, this movement of the control arm 68 causes the actuator member 46 to move the cam ring 32 in a counterclockwise direction about the pivot connection 42. Therefore, the displacement of the pump unit 14 is changed from a minimum or neutral displacement by an amount which is a function of the extent of movement of the handle 52 after one of the springs 82 or 84 has been compressed by initial movement of the handle.

When the control linkage 54 is in the forward actuated position as shown in solid lines in FIG. 1, the control arm 68 is held against rotation by frictional engagement with flat parallel face or major surfaces 98 and 100 of the holding plates 64 and 66 which are continuously urged toward each other by the springs 72 and 74. Therefore, the control link 68 and cam ring 32 are held against oscillation under the influence of any hydraulic pulses which may be generated during operation of the hydrostatic transmission 10.

If the load on the hydrostatic transmission 10 increases during forward operation, the internal forces within the pump unit 14 tend to pivot the cam ring 32 back toward the neutral condition with an increasing force. This tendency of the cam ring 32 to move back toward the neutral condition under the influence of the internal forces is offset or opposed by the frictional clamping engagement of the neutral locate and hold assembly 56 with the control arm 68. Therefore, the neutral locate and hold assembly 56 cooperates with the linkage 54 to maintain the effective displacement of the pump unit 14 substantially constant as an increasing load is applied to the transmission 10. Similarly, the cam ring 32 is held against rotational movement by the cooperation between the linkage arrangement 54 and the neutral locate and hold assembly 56 when the load on the hydrostatic transmission 10 is decreased.

When the hydrostatic transmission 10 is to be rendered ineffective to transmit drive forces, the control lever 52 is returned back to the neutral position of FIG. 2. Upon initial movement of the control lever 52 toward the neutral position, the spring 84 is relaxed and the spring 82 is compressed to overcome the frictional holding forces applied to the control arm 68 by the neutral locate and hold assembly 56. Continued movement of the control handle 52 toward the upright neutral position of FIG. 2 moves the control arm 68 from the forward actuated position illustrated in solid lines in FIG. 1.

As the control lever 52 approaches the upright neutral position of FIG. 2, the spring 82 remains compressed under the influence of the frictional holding forces applied to the control arm 68 by the neutral locate and hold assembly 56. Since the spring 82 is compressed, the position of the control arm 68 lags somewhat behind the position of the control handle 52. Therefore, movement of the control handle 52 to its neutral position will be effective to merely move the control link 68 to a position approximating the neutral position shown in FIG. 2. Thus, movement of the control handle 52 to its neutral position is effective to move the control arm 68 to a position in which the longitudinal axis of the control arm is slightly skewed relative to the longitudinal axis of the V-shaped grove 78. Of course, if the control arm 68 is not moved to its exact neutral position in which the longitudinal axis of the control arm is parallel to the longitudinal axis of the V-shaped groove 78, the cam ring 32 will remain in a slightly forward swashed condition so that the pump 14 continues to supply fluid under pressure to the motor 16.

To effect operation of the pump unit 14 to the neutral condition when the handle 52 is moved to its neutral position, the neutral locate and hold assembly 56 applies a force to the control arm 68 to pivot the control arm to the neutral position. To move the control arm 68 and operate the cam ring 32 to the neutral position when the control handle 52 is at neutral, the angularly disposed side surfaces 92 and 94 of the elongated recess 78 tend to pivot the control arm 68 to the neutral position after the control arm has been moved to a position approximating the neutral position by operation of the control handle 52. To effect movement of the control arm 68 to the neutral position, the surfaces 92 and 94 of the recess 78 are pressed toward each other by the springs 72 and 74 to apply a camming force to a circular end portion 110 of the control arm 54 when the control arm is moved by the handle 52 to a position in which the circular end portion is at least partially disposed between the corners 112 and 114 formed by the intersection of the side surfaces 92 and 94 with the flat major surface 100 of the holding plate 66. This camming force is enough to pivot the control link 68 to the illustrated neutral position of FIG. 2 after it has been moved to a position approximating the neutral position by operation of the control handle 52.

Of course, when the control handle 52 is moved in a reverse direction, the neutral locate and hold assembly 56 cooperates with the linkage arrangement 54 in the same manner as when the control handle is moved in a forward direction. It should be noted that the springs 82 or 84 must be compressed to a greater extent to move the control arm 68 from the neutral position toward an operated position than the springs are compressed to move the control arm from an operated position toward the neutral position. This is because the recess 78 is more effective to retain the control arm 68 against movement and are the flat surfaces 98 and 100 of the holding plates 64 and 66. This relatively strong neutral holding force prevents the control lever 52 from being inadvertantly moved from the neutral position.

It is contemplated that when the hydrostatic transmission is in the forward operated condition of FIG. 1, it may be desirable to quickly deswash the hydrostatic transmission during a panic stopping condition. To facilitate dewashing or returning the hydrostatic transmission 10 to the neutral condition during a panic stop, an override pedal 120 and linkage 122 (see FIG. 2) are provided in association with the main control linkage arrangement 54. When a panic stopping condition is present, the pedal 120 is actuated to move the override lever 124 toward the left as viewed in FIG. 1 to pivot the control arm 68 from the forward operated position (FIG. 1) toward the neutral position (illustrated in dashed lines in FIG. 1). During this movement of the override lever 124, the control handle 52 is moved toward its upright neutral position. However, if the control handle is manually restrained against movement, the spring 84 will be further compressed as the control arm 68 moves toward its neutral position. Of course, the cam surfaces 92 and 94 of the neutral locate and hold assembly 56 press against the cylindrical end portion of 110 of the control arm 68 to move the control arm and the cam ring 32 to their exact neutral positions once the control arm 68 has been moved to a position approximating its neutral position by operation of the override linkage 122.

To enable the neutral locate and hold assembly 56 to operate the cam ring 32 to its exact neutral position, the neutral locate and hold assembly 56 must be precisely located relative to the cam ring. Accordingly, the position of the holding plates 64 and 66 can be adjusted relative to the cam ring 32 by loosening fasteners 130 and 132 which connect the holding plate 64 to a support wall 134. Once the position of the neutral locate and hold assembly 56 has been adjusted to move the cam ring 32 to its exact neutral position with the control arm 68 in the recess 78, the fasteners 130, 132 are tightened to thereby retain the neutral locate and hold assembly 56 against movement from this position.

In view of the foregoing description, it can be seen that the control apparatus 12 includes a neutral locate and hold assembly 56 which cooperates with a linkage 54 to retain the control arm 68 and cam ring 32 against movement from the neutral position of FIG. 2 or the operated position of FIG. 1. However, due to the cooperation between the recess 78 and the control arm 68, the neutral locate and hold assembly 56 resists movement of the control arm and cam ring 32 from the neutral position with a retaining force which is greater than the retaining force which resists movement of the cam ring from an operated position. This enables the control handle 52 to be moved through a relatively wide range from the neutral position before the displacement of the pump unit 14 is changed. In addition, the neutral locate and hold assembly 56 returns the cam ring 32 and control arm 68 to their neutral positions when the control arm 68 is operated to a position closely approximating the neutral position by operation of the control handle 52. This enables the pump unit 14 to be returned to its exact neutral position upon movement of the handle 52 to its neutral position even though the handle 52 is yieldably connected with the control arm 68 by the springs 82 and 84.

Having described a specific preferred embodiment of the invention, the following is claimed:

1. Apparatus comprising pump means for supplying fluid under pressure, displacement varying means for varying the effective displacement of said pump means between a minimum effective displacement condition and a maximum effective displacement condition, control means for selectively operating said displacement varying means to vary the output of said pump means, said control means including a control member movable between a neutral position corresponding to the minimum effective displacement of said pump means and an operating position corresponding to the maximum effective displacement of said pump means, linkage means for effecting operation of said displacement varying means in response to movement of said control member, and neutral locating and hold means connected with said linkage means for applying a force to said linkage means to operate said displacement vayring means to the minimum displacement condition upon operation of said displacement varying means by said linkage means to a condition approximating the minimum displacement condition and to apply a force to said linkage means to releasably hold said linkage means in an actuated position to yieldably retain said displacement varying means in an actuated condition, said displacement varying means which may tend to oscillate under the influence of hydraulic pulses, said neutral locating and hold means including members yieldably gripping a part of said linkage means to retard oscillatory movement of said displacement varying means under the influence of such hydraulic pulses.

2. Apparatus comprising pump means for supplying fluid under pressure, displacement varying means for varying the effective displacement of said pump means between a minimum effective displacement condition and a maximum effective displacement condition, control means for selectively operating said displacement varying means to vary the output of said pump means, said control means including a control member movable between a neutral position corresponding to the minimum effective displacement of said pump means and an operating position corresponding to the maximum effective displacement of said pump means, linkage means for effecting operation of said displacement varying means in response to movement of said control member, and neutral locating and hold means connected with said linkage means for applying a force to said linkage means to operate said displacement varying means to the minimum displacement condition upon operation of said displacement varying means by said linkage means to a condition approximating the minimum displacement condition and to apply a force to said linkage means to releasably hold said linkage means in an actuated position to yieldably retain said displacement varying means in an actuated condition, said neutral locating and hold means including a member disposed in engagement with a part of said linkage means, biasing means for pressing said member against the engaged part of said linkage means to frictionally retain the engaged part against movement, and means for defining a recess for receiving the engaged part of said linkage means when said displacement varying means is in minimum displacement condition.

3. Apparatus comprising pump means for supplying fluid under pressure, displacement varying means for varying the effective displacement of said pump means between a minimum effective displacement condition and a maximum effective displacement condition, control means for selectively operating said displacement varying means to vary the output of said pump means, said control means including a control member movable through different distances from a neutral position corresponding to the minimum effective displacement of said pump means to any one of a plurality of operating positions each of which corresponds to a different effective operating displacement of said pump means, linkage means for effecting operation of said displacement varying means in response to movement of said control member, said linkage means including a first link which is connected with said control member for movement therewith through a distance which is a function of the distance through which said control member is moved, a second link which is connected with said displacement varying means, spring means yieldably interconnecting said first and second links for transmitting force from said first link to said second link upon movement of said first link and for enabling relative movement to occur between said first and second links, said holding means connected with said second link for yieldably gripping said second link to retain it in the position to which it is moved, said holding means including first holding means to retain said second link with a first holding force against movement from a position corresponding to the minimum effective displacement condition of said pump means under the influence of forces transmitted by said spring means to said second link to maintain said pump means in the minumum displacement condition as said control member is moved through a first distance from the neutral position, said holding means including second means for yieldably retaining said second link against movement from a position corresponding to an effective operating displacement of said pump means with a second holding force which is less than the first holding force to retard changes in the effective operating displacement to said pump means upon initial movement of said control member from any one of said plurality of operating positions.

4. Apparatus comprising pump means for supplying fluid under pressure, displacement varying means for varying the effective displacement of said pump means between a minimum effective displacement condition and a maximum effective displacement condition, control means for selectively operating said displacement varying means to vary the output of said pump means, said control means including a control member movable through different distances from a neutral position corresponding to the minimum effective displacement of said pump means to any one of a plurality of operating positions each of which corresponds to a different effective operating displacement of said pump means, linkage means for effecting operation of said displacement varying means in response to movement of said control member, said linkage means including a first link which is connected with said control member for movement therewith through a distance which is a function of the distance through which said control member is moved, a second link which is connected with said displacement varying means, spring means yieldably interconnecting said first and second links for transmitting force from said first link to said second link upon movement of said first link and for enabling relative movement to occur between said first and second links, and holding means connected with said second link for yieldably retaining said second link in the position to which it is moved, said holding means includes means for moving said second link to the position corresponding to the minimum effective displacement of said pump means against the influence of said spring means upon movement of said second link to a position approximating this position in response to movement of said control member and second link.

5. Apparatus comprising pump means for supplying fluid under pressure, displacement varying means for varying the effective displacement of said pump means between a minimum effective displacement condition and a maximum effective displacement condition, control means for selectively operating said displacement varying means to vary the output of said pump means, said control means including a control member movable between a neutral position corresponding to the minimum effective displacement of said pump means and an operating position corresponding to the maximum effective displacement of said pump means, linkage means for effecting operation of said displacement varying means in response to movement of said control member, and neutral locating and hold means connected with said linkage means for applying a force to said linkage means to operate said displacement varying means to the minimum displacement condition upon operation of said displacement varying means by said linkage means to a condition approximating the minimum displacement condition and to apply a force to said linkage means to releasably hold said linkage means in an actuated position to yieldably retain said displacement varying means in an actuated condition, said neutral locating and hold means including means for applying a force to hold said linkage in neutral and further including means for adjusting the location of said neutral locating and hold means relative to said displacement varying means and said linkage means to enable said neutral locating and hold means to be adjusted to hold said displacement varying means in the minimum displacement condition when said control member is at the neutral position.

6. Apparatus as set forth in claim 5 wherein said linkage means includes a link which is connected with said displacement varying means, said neutral locating and hold means including means for applying a force to said link to move said link and operate said displacement varying means to the minimum displacement condition.

7. Apparatus comprising pump means for supplying fluid under pressure, displacement varying means for varying the effective displacement of said pump means between a minimum effective displacement condition and a maximum effective displacement condition, control means for selectively operating said displacement varying means to vary the output of said pump means, said control means including a control-member movable between a neutral position corresponding to the minimum effective displacement of said pump means and an operating position corresponding to the maximum effective displacement of said pump means, linkage means for effective operation of said displacement varying means in response to movement of said control member, and neutral locating and hold means connected with said linkage means for applying a force to said linkage means to operate said displacement varying means to the minimum displacement condition upon operation of said displacement varying means by said linkage means to a condition approximating the minimum displacement condition and to apply a force to said linkage means to releasably hold said linkage means in an actuated position to yieldably retain said displacement varying means in an actuated condition, said control means includes a selectively operable override means for actuating said linkage means to operate said displacement varying means toward the minimum displacement condition when said control member is in an operating position other than the neutral position, said neutral locating and hold means being operable to operate said displacement varying means to the minimum displacement condition upon operation of said displacement varying means to a condition approximating the minimum displacement condition under the influence of said override means.

8. Apparatus as set forth in claim 7 wherein said linkage means includes a first link operatively connected with said control member, a second link connected with said displacement varying means, and spring means yieldably interconnecting said first and second links for enabling said control member and first link to move relative to said second link, said neutral locating and hold means being operable to hold said second link against movement under the influence of said first link upon initial movement of said control member in a direction away from the neutral position.

9. Apparatus comprising pump means for supplying fluid under pressure, displacement varying means for varying the effective displacement of said pump means between a minimum effective displacement condition and a maximum effective displacement condition, control means for selectively operating said displacement varying means to vary the output of said pump means, said control means including a control member movable through different distances from a neutral position corresponding to the minimum effective displacement of said pump means to any one of a plurality of operating positions each of which corresponds to a different effective operating displacement of said pump means, linkage means for effecting operation of said displacement varying means in response to movement of said control member, said linkage means including a first link which is connected with said control member for movement therewith through a distance which is a function of the distance through which said control member is moved, a second link which is connected with said displacement varying means, spring means yieldably interconnecting said first and second links for transmitting force from said first link to said second link upon movement of said first link and for enabling relative movement to occur between said first and second links, and holding means connected with said second link for yieldably gripping said second link to retain it in the posiiton to which it is moved, said holding means including first and second holding members disposed in abutting engagement with opposite side portions of said second link and biasing means for pressing said holding members against the opposite side portions of said second link to frictionally retain said second link against movement, and further including recess means which is at least partially defined by one of said holding members for receiving said second link when said second link is in the position corresponding to the minimum effective displacement of said pump means.

10. Apparatus as set forth in claim 9 wherein said holding means includes means for enabling the position of said recess means to be adjusted relative to said second link.

11. Apparatus comprising pump means for supplying fluid under pressure, displacement varying means for varying the effective displacement of said pump means between a minimum effective displacement condition and a maximum effective displacement condition, control means for selectively operating said displacement varying means to vary the output of said pump means, said control means including a control member movable through different distances from a neutral position corresponding to the minimum effective displacement of said pump means to any one of a plurality of operating positions each of which corresponds to a different effective operating displacement of said pump means, linkage means for effecting operation of said displacement varying means in response to movement of said control member, said linkage means including a link which is connected with said control member for movement therewith through a distance which is a function of the distance through which said control member is moved, and holding means connected with said link for yieldably retaining said link in the position to which it is moved, said holding means including first holding means for retaining said link with a first holding force against movement from a position corresponding to the minimum effective displacement condition of said pump means to thereby tend to maintain said pump means in the minimum displacement condition, said holding means including second means for yieldably retaining said link against movement from a position corresponding to an effective operating displacement of said pump means with a second holding force which is less than the first holding force to retard changes in the effective operating displacement to said pump means.

12. Apparatus as set forth in claim 11 wherein said holding means includes first and second holding members disposed in abutting engagement with opposite side portions of said link and biasing means for pressing said holding members against the opposite side portions of said link to frictionally retain said link against movement, and further including recess means which is at least partially defined by one of said holding members for receiving said link when said link is in the position corresponding to the minimum effective displacement of said pump means.

13. Apparatus comprising pump means for supplying fluid under pressure, displacement varying means for varying the effective displacement of said pump means between a minimum effective displacement condition and a maximum effective displacement condition, control means for selectively operating said displacement varying means to vary the output of said pump means, said control means including a control member movable through different distances from a neutral position corresponding to the minimum effective displacement of said pump means to any one of a plurality of operating positions each of which corresponds to a different effective operating displacement of said pump means, linkage means for effecting operation of said displacement varying means in response to movement of said control member, said linkage means including a first link which is connected with said control member for movement therewith through a distance which is a function of the distance through which said control member is moved, a second link which is connected with said displacement varying means, spring means yieldably interconnecting said first and second links for transmitting force from said first link to said second link upon movement of said first link and for enabling relative movement to occur between said first and second links, and holding means connected with said second link for yieldably gripping said second link to retain it in the position to which it is moved, said holding means including means for moving said second link to the position corresponding to the minimum effective displacement of said pump means upon movement of said second link to a position approximating this position in response to movement of said control member and second link.

14. An apparatus as set forth in claim 13 further including selectively operable override means for effecting operation of said displacement varying mean to reduce the effective operating displacement of said pump means, said override means including means for moving said second link against the influence of said holding means and said spring means.

15. Apparatus comprising pump means for supplying fluid under pressure, displacement varying means for varying the effective displacement of said pump means between a minimum effective displacement condition and a maximum effective displacement condition, control means for selectively operating said displacement varying means to vary the output of said pump means, said control means including a first member movable between a neutral position corresponding to the minimum effective displacement of said pump means and an operating position corresponding to the maximum effective displacement of said pump means, linkage means for effecting operation of said displacement varying means in response to movement of said first member, said linkage means including a second member which is connected with said control means and said first member, and neutral locating and holding means for yieldably retaining said displacement varying means in an actuated condition, for effecting operation of said displacement varying means to the minimum displacement condition upon operation of said displacement varying means by said linkage to a condition approximating the minimum displacement condition, and for yieldably retaining said displacement varying means in the minimum displacement condition, said neutral locating and hold means including means for applying a force to one of said members to releasably hold said one member against movement when said displacement varying means is in an actuated condition, for applying a force to said one member to move said one member and operate said displacement varying means to the minimum displacement condition upon operation of said displacement varying means to a condition approximating the minimum displacement condition, and for applying a force to said one member to releasably hold said one member against movement when said displacement varying means is in the minimum displacement condition.

16. An apparatus as set forth in claim 15 wherein said means for applying a force to said one member includes means for resisting movement of said one member with a force of a first magnitude when said displacement varying means is in the actuated condition and for resisting movement of said one member with a force of a second magnitude which is greater than said first magnitude when said displacement varying means is in the minimum displacement condition.

17. Apparatus as set forth in claim 15 wherein said linkage means further includes spring means yieldably interconnecting said first and second members for enabling said first member to move relative to said second member, said neutral locating and hold means being operable to hold said second member against movement under the influence of said first member upon initial movement of said first member in a direction away from the neutral position.

18. Apparatus as set forth in claim 15 wherein said control means includes a selectively operable override means for moving said one member to operate said displacement varying means toward the minimum displacement condition when said displacement varying means is in an actuated condition, said neutral locating and hold means being operable to operate said displacement varying means to the minimum displacement condition upon operation of said displacement varying means to a condition approximating the minimum displacement condition under the influence of said override means.

19. Apparatus comprising pump means for supplying fluid under pressure, displacement varying means for varying the effective displacement of said pump means between a minimum effective displacement condition and a maximum effective displacement condition, linkage means including a plurality of links for effecting operation of said displacement varying means to vary the displacement of said pump between the minimum and maximum displacement conditions, control means for actuating said linkage means to operate said displacement varying means and thereby vary the output of the pump means, said control means including a control member movable through different distances from a neutral position corresponding to the minimum effective displacement of said pump means to any one of a plurality of operating positions each of which corresponds to a different effective operating displacement of said pump means, first and second retaining means for frictionally engaging opposite sides of one of the links of said linkage means, and biasing means for pressing said first and second retaining means against said one link to yieldably hold said linkage means in a condition to which it is actuated by said control means.

20. Apparatus as set forth in claim 19 wherein said first and second retaining means each include a member having a planar surface which is pressed against said one link by said biasing means to yieldably hold said linkage means in an actuated condition.

21. Apparatus as set forth in claim 20 wherein one of the retaining members includes surface portions at least partially defining a recess for receiving said one link when said pump means is in the minimum displacement condition.

22. Apparatus as set forth in claim 21 wherein said one retaining member further includes first surface means extending in a first direction from said recess for frictionally engaging said one link upon operation of said displacement varying means to increase the displacement of said pump means in one direction from the minimum displacement condition and second surface means extending in a second direction from said recess for frictionally engaging said one link upon operation of said displacement varying means to increase the displacement of said pump means in another direction from the minimum displacement condition.

* * * * *